United States Patent [19]

Murphy

[11] Patent Number: 4,910,631
[45] Date of Patent: Mar. 20, 1990

[54] CIRCUIT BREAKER WITH OVER-TEMPERATURE PROTECTION AND LOW ERROR I²T CALCULATOR

[75] Inventor: William J. Murphy, Monroeville, Pa.

[73] Assignee: Westinghouse Electric Corp., Pittsburgh, Pa.

[21] Appl. No.: 148,392

[22] Filed: Jan. 25, 1988

[51] Int. Cl.⁴ .............................................. H02H 3/06
[52] U.S. Cl. ...................................... 361/96; 361/931; 361/94; 361/110; 323/907
[58] Field of Search ..................... 361/24, 27, 87, 93, 361/94, 98, 106, 96, 29, 97, 45, 103, 59, 60, 61, 110; 323/313, 314, 907

[56] References Cited

U.S. PATENT DOCUMENTS

| | | | |
|---|---|---|---|
| 3,588,595 | 6/1971 | Silvers | 361/106 X |
| 3,702,418 | 11/1972 | Obenhaus | 361/106 X |
| 3,818,275 | 6/1974 | Shimp | 361/94 |
| 3,826,951 | 7/1974 | Mater et al. | 361/100 |
| 4,266,259 | 5/1981 | Howell | 361/97 |
| 4,315,295 | 2/1982 | Zocholl | 361/96 |
| 4,345,292 | 8/1982 | Jaeschke et al. | 361/94 |
| 4,347,541 | 8/1982 | Chen et al. | 361/50 |
| 4,368,420 | 1/1983 | Kuo | 323/303 |
| 4,389,619 | 6/1983 | Limberg | 330/288 |
| 4,394,957 | 7/1983 | Newton III | 236/49 |
| 4,489,295 | 12/1984 | Altenhof et al. | 335/20 |
| 4,503,408 | 3/1985 | Mrenna et al. | 335/35 |
| 4,528,531 | 7/1985 | Flick et al. | 335/23 |
| 4,539,538 | 9/1985 | Flick et al. | 335/16 |
| 4,540,961 | 9/1985 | Maier | 335/16 |
| 4,550,360 | 10/1985 | Dougherty et al. | 361/93 |
| 4,551,597 | 11/1985 | Maier | 200/249 |
| 4,553,115 | 11/1985 | Grunert et al. | 335/14 |
| 4,553,116 | 11/1985 | Bagalini | 335/20 |
| 4,554,421 | 11/1985 | Grunert et al. | 200/43.15 |
| 4,554,423 | 11/1985 | Flick et al. | 200/293 |
| 4,554,427 | 11/1985 | Flick et al. | 200/250 |
| 4,563,557 | 1/1986 | Lenone | 200/288 |
| 4,594,491 | 6/1986 | Lenone et al. | 200/325 |
| 4,603,313 | 7/1986 | Shimp et al. | 335/172 |
| 4,639,701 | 1/1987 | Shimp | 335/21 |
| 4,695,961 | 9/1987 | Arinobu | 364/483 |
| 4,703,389 | 10/1987 | Scott | 361/93 |
| 4,751,454 | 6/1988 | Dielacher | 323/314 |

Primary Examiner—A. D. Pellinen
Assistant Examiner—David Osborn
Attorney, Agent, or Firm—M. J. Moran

[57] ABSTRACT

A circuit breaker with over-temperature protector and low error I²t calculator is provided. The over-temperature protector includes a fixed current source which provides current to a resistive element to produce a voltage which thereacross which increases with a positive temperature coefficient as the surrounding temperature increases. The resistor is connected to the base-to-emitter circuit of a transistor. The base-to-emitter circuit has a minimum firing voltage which decreases with an increase in ambient temperature. The value of the resistive element, the amount of current provided by the fixed current source and the transistor base-to-emitter minimum firing voltage are chosen to cause a circuit breaker to be actuated. There is also provided an active memory device which is utilized to discharge a capacitor with a time constant which approximates the heat dissipating time constant associated with a conductor to be protected by the circuit breaker in question.

3 Claims, 4 Drawing Sheets

CIRCUIT BREAKER WITH OVER-TEMPERATURE PROTECTION AND LOW ERROR I²T CALCULATOR

BACKGROUND OF THE INVENTION

Molded case circuit breakers or the like include control circuitry which may be of the discrete nature or of the integrated circuit nature. Regardless, the reliability of the control circuit becomes questionable in high temperature environments such as may be found in a desert during the daytime or such as may be caused by local electromechanical problems such as poorly connected load conductors. Because of this, circuit breakers and the like are provided with overtemperature protection which causes the circuit breakers to automatically trip when the temperature of the circuit breaker exceeds a predetermined value which may vary according to local standards, designs, specifications, etc. A typical example of a temperature above which circuit breaker tripping is required for failsafe operation is 90° C. In the past, thermistors have been utilized to cause over temperature tripping in the firing circuits for silicon-controlled rectifiers which are connected in series with circuit breaker trip coils or trip devices. Typically, the silicon-controlled rectifiers are gate-controlled to cause the trip coils or trip devices to be energized under certain Well-known circuit breaker conditions such as over-load, short circuit, undervoltage, etc. The thermistor circuit operates independently of the latter mentioned to cause the silicon controlled rectifier to be fired to cause the circuit breaker to trip because of the presence of ambient over-temperature conditions.

Circuit breaker control systems often include large scale integrated circuits and precision voltage references. A band gap reference is a typical precision voltage reference. The band gap reference circuit utilizes the base to emitter voltage of a transistor—which has a negative temperature coefficient connected in series with the voltage developed across a resistor which has a positive temperature coefficient—as a reference voltage. The voltage developed across the resistor is a function of a predetermined fixed current which is supplied to the resistor from circuitry internal to the band gap regulated reference. The difference in temperature coefficients between the base-to-emitter voltage of the transistor and the series-connected resistor provides an output voltage reference signal which is relatively independent of the temperature to which the control circuit is exposed. As the base-to-emitter voltage of the transistor decreases with an increase in temperature, the voltage across the current fed series connected resistor increases generally proportionally to provide an output reference voltage which remains relatively constant. It is to be noted that the series-connected resistor though heretofore utilized as a temperature compensating device for a voltage regulator has properties which make it useful as an over-temperature detector replacement for the thyristor circuit previously described. It would be advantageous if a way could be found to utilize the latter concepts to provide a reliable, efficient, inexpensive over-temperature protection circuit for a circuit breaker.

It is also well-known in the prior art to trip a circuit breaker as a function of the current squared in a conductor protected by the circuit breaker times time (I²t). This is represented by the well-known I²t control circuit characteristic for a circuit breaker. The I²t characteristic is utilized because that characteristic is most representative of the amount of heat which is built up in the conductors which are protected by the circuit breaker. Said in another way, the heat in a conductor protected by a circuit breaker is proportional to the square of the current flowing through that conductor. The larger the build-up of heat, the higher the temperature of the conductor. The higher the temperature of the conductor, the more likely it is to cause insulation failure, personnel burns, ignition of closely-located flammable materials and the like. To provide the I²t protection in a circuit breaker, typically a circuit is provided within the circuit breaker control system which charges a capacitor with a relatively small charging current which is proportional to the square of the current flowing in the conductor to be protected. The resultant voltage developed across the capacitor is thus a proportional indication of the heat which is being built up in the conductor which is being protected by the circuit breaker. Voltage sensitive tripping circuitry then utilizes the voltage across the capacitor to cause the aforementioned silicon-controlled rectifier, for example, to be fired to actuate a tripping mechanism. It is undesirous, however, to cause a circuit breaker to trip when the need ceases to exist. Such a ceases. For example, when overload current in a conductor which is to be protected drops to a lower value, the conductor begins to dissipate heat so that the danger associated with previous heat build-up lessens. The electronic circuitry which models the build-up of heat through the charging of a capacitor must also represent the heat dissipation, otherwise the circuit breaker may be unnecessarily tripped at a later time when the overload current increases again. In order to accomplish this, typically a memory resistor is utilized in the prior art which slowly discharges the previously-described capacitor with a time constant which is deliberately chosen to approximate the time constant associated with the dissipation of heat in the protected electrical conductor. Typically, this memory resistor in the prior art is connected in parallel with the capacitor in question. When the capacitor charging current drops to a low value, the capacitor may begin to discharge through the resistor with a time constant which approximates the heat dissipation characteristics of the conductor to be protected. This arrangement, however, has a disadvantage during the charging cycle or portion of the operation when the capacitor is being charged by the previously-described electrical current which is related to the square of the line current. The reason for this lies in the fact that the memory resistor provides a parallel path for the aforementioned charging current and consequently, some of the current which should be provided to the capacitor for producing a voltage which is representative of the heat in the conductor to be protected in fact flows through the resistor thus introducing an error into the control system as a result thereof. This is especially critical at low values of overload currents where the error becomes significant. It would be advantageous, therefore, to provide circuitry which would allow the use of the memory function as previously discussed without presenting the problem associated with the parallel path for the capacitor charging current.

Circuit breaker apparatus in which it is desirous to use the teachings of the present invention are found described in the following patents assigned to the assignee of the present application: U.S. Pat. No.

4,554,421 issued Nov. 19, 1985 to K. A. Grunert et al. and entitled "Molded Case Circuit Breaker With Handle Lock", U.S. Pat. No. 4,639,701 issued Jan. 27, 1987 to A. B. Shimp entitled "Circuit Breaker With Interface Flux Shunt Trip" and U.S. Pat. No. 4,540,961 issued Sept. 10, 1985 to Maier entitled "Molded Case Circuit Breaker With An Apertured Molded Cross Bar for Supporting a Movable Electrical Contact Arm".

SUMMARY OF THE INVENTION

In accordance with the invention, a circuit breaker is taught which includes a silicon-controlled rectifier or similar gated device connected in series with a flux shunt trip or similar tripping device. When sufficient gate current is supplied to the gate of the silicon-controlled rectifier, the tripping device is actuated to cause the main contacts in the circuit breaker to open. The gate current is supplied by a switch or transistor-controlled current source. The switch or transistor is in turn controlled at the base terminal thereof, for instance, by a second transistor which conducts for actuating the base-to-emitter circuit of the first transistor, i.e., causing the first transistor to conduct. The base of the controlling transistor is connected to an appropriately chosen junction point in the series-connected resistor of a band gap regulator reference circuit. The series connected resistor has a positive temperature coefficient and this interacts with the negative temperature coefficient of the base-to-emitter circuit of the controlling transistor to cause that transistor to conduct when the over-temperature value is reached. In another embodiment of the invention, the emitter of the controlling transistor may be connected to system common or ground by way of a resistor which has a given ohms per °C. characteristic so that the over-temperature value may be raised in a predictable manner. In still another embodiment of the invention, the emitter of the controlling transistor is left unconnected to ground so that the over-temperature operation is defeated or disabled. In still another embodiment of the invention, a memory resistor for an $I^2t$ calculating circuit is replaced by an active switch controlled device so that the capacitor discharging memory operation may be utilized when the aforementioned device is turned on. However, when the memory operation is not required, the aforementioned device is turned off and essentially disconnected from the charging circuit so that all of the current which is representative of the heat build-up in the conductor being protected by the circuit breaker in question is supplied directly to the capacitor thus reducing the error previously associated with the parallel memory resistive path.

BRIEF DESCRIPTION OF THE DRAWINGS

For a better understanding of the invention, reference may be had to the preferred embodiment thereof shown in the accompanying drawings, in which.

DESCRIPTION OF THE PREFERRED EMBODIMENTS

Figure 1:
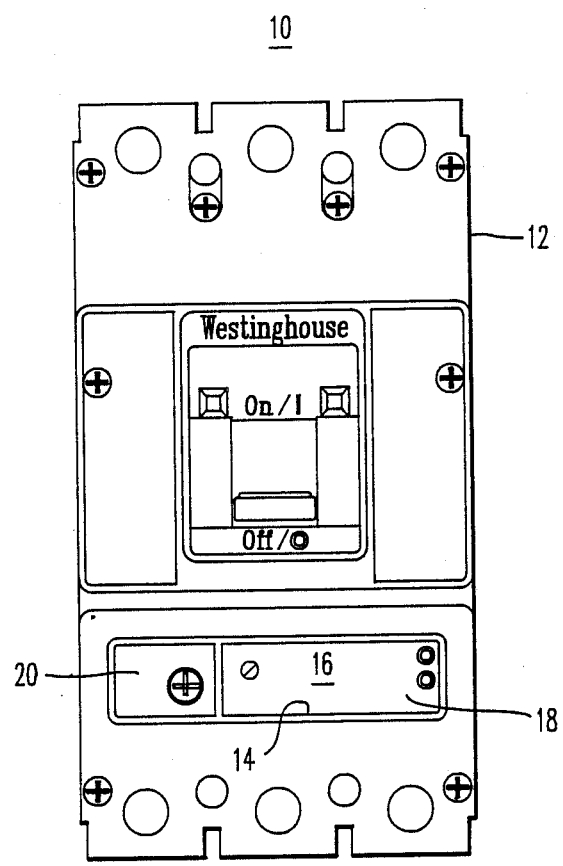
FIG. 1 shows a front view of a molded case circuit breaker utilizing the concepts of the present invention.

Referring now to the drawings and FIG. 1 in particular, the apparatus which is the subject of the present invention is shown. In particular, a molded case circuit breaker 10 is depicted. The molded case circuit breaker 10 may be any of the kind shown and described in the previously described U.S. patents which are assigned to the assignee of the present invention.

A circuit breaker frame 12 is provided which may have a recessed opening 14 therein into which may be disposed a reusable and replaceable trip unit mechanism 16 such as the kind shown and described with respect to the aforementioned U.S. Pat. No. 4,639,701. The trip unit mechanism 16 may include as part thereof electronic control circuitry contained in a solid state trip unit 18 which includes as part thereof a separately reusable, removable and replaceable resistor rating plug 20. The use and function of a prior art solid state trip unit is set forth in U.S. Pat. No. 3,818,275. Issued June 18, 1974 by A. B. Shimp and entitled "Circuit Interrupter Including Improved Trip Circuit Using Current Transformers". The use and function of a rating plug is set forth in U.S. Pat. No. 3,826,951 issued July 30, 1974 to Maier et al. entitled "Circuit Breaker With Replaceable Rating Adjustor and Interlock Means" and U.S. Pat. No. 4,603,313 issued July 29, 1986 to Shimp et al. and entitled "Circuit Breaker With Replaceable Rating Plug Interlock and Push-to-Trip Button". All of the previously-mentioned U.S. patents are assigned to the same assignee as the present invention. In a preferred embodiment of the invention, the circuit breaker 10 may be a 600 volt AC maximum rated device using interchangeable, adjustable magnetic or electronic trip units rate up to 400 amps continuous current. The foregoing should be considered as illustrative of an actual embodiment in which the teachings of the present invention may reside. However, the previously-described illustrative examples are not to be considered as limiting. The teachings of the present invention may be applied to a wide range of circuit breaker applications and should not be considered to be limited by frame size, commercial frame designation, commercial trade name or trademark, power, voltage or current rating. Furthermore, the actual type of circuit breaker is not limiting.

Figure 2A:
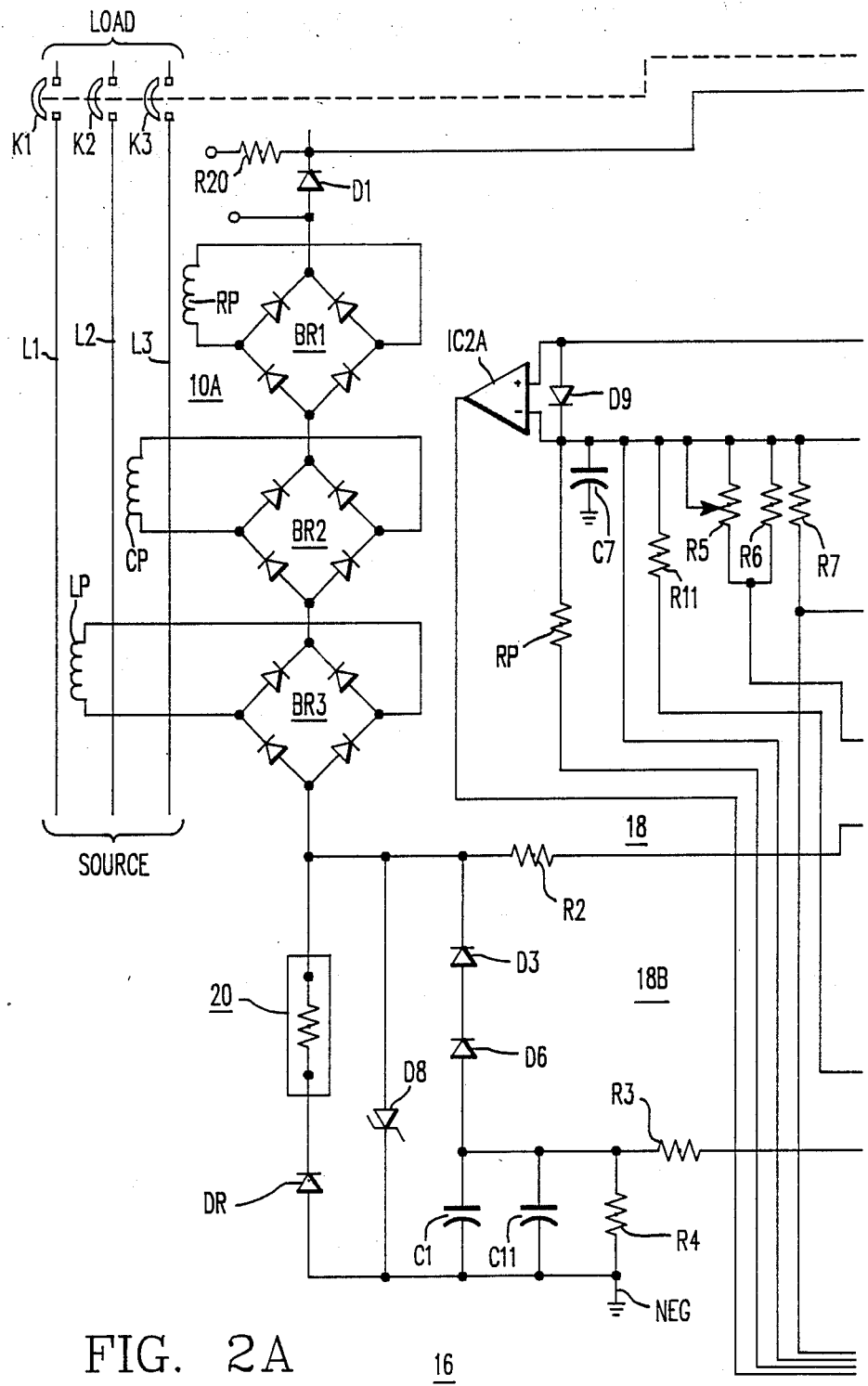
FIGS. 2A-2C show an electrical and mechanical diagram partially in schematic form and partially in functional block diagram form of the electrical and electromechanical elements of the present invention.
Figure 2B:
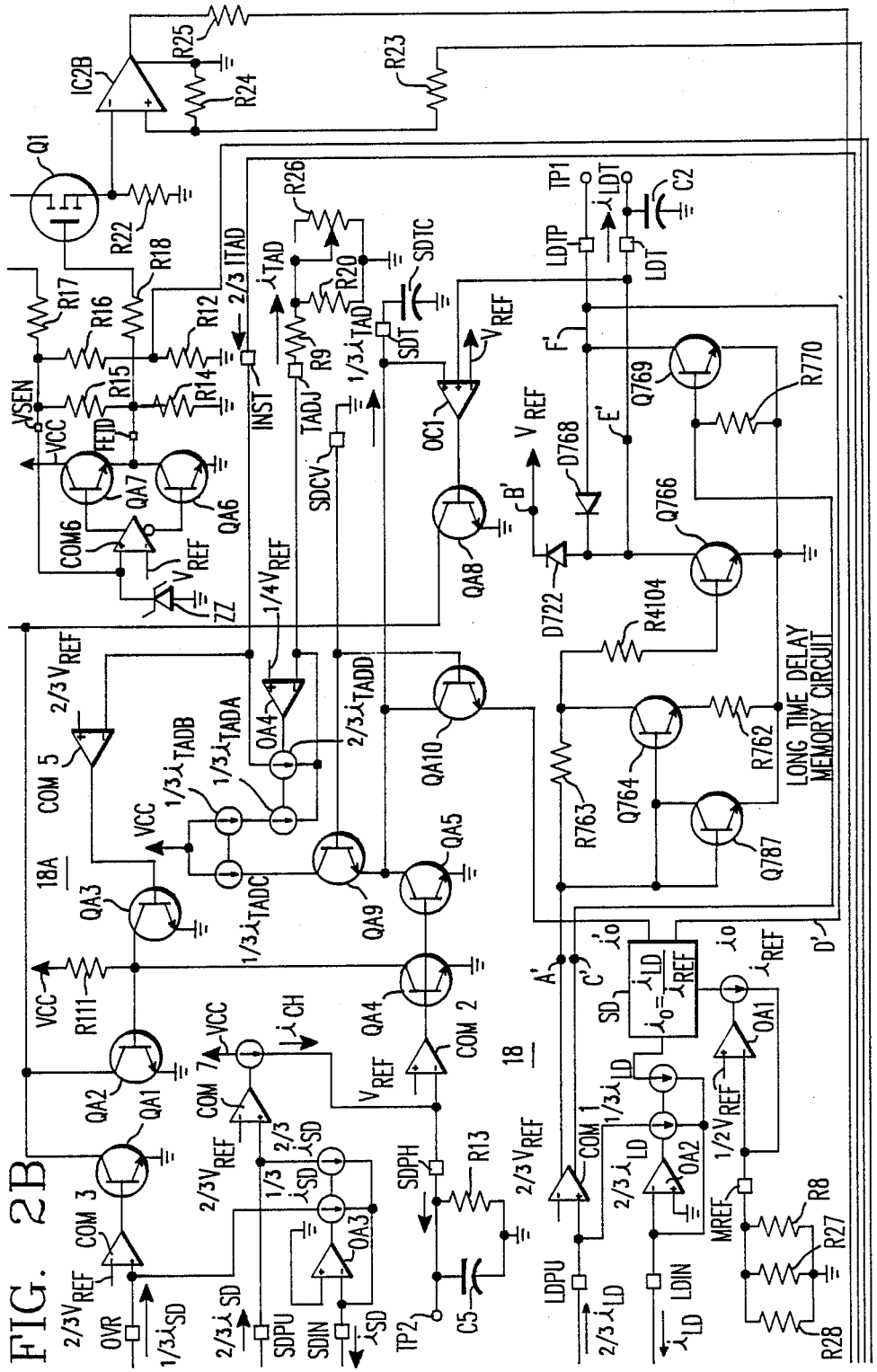
Figure 2C:
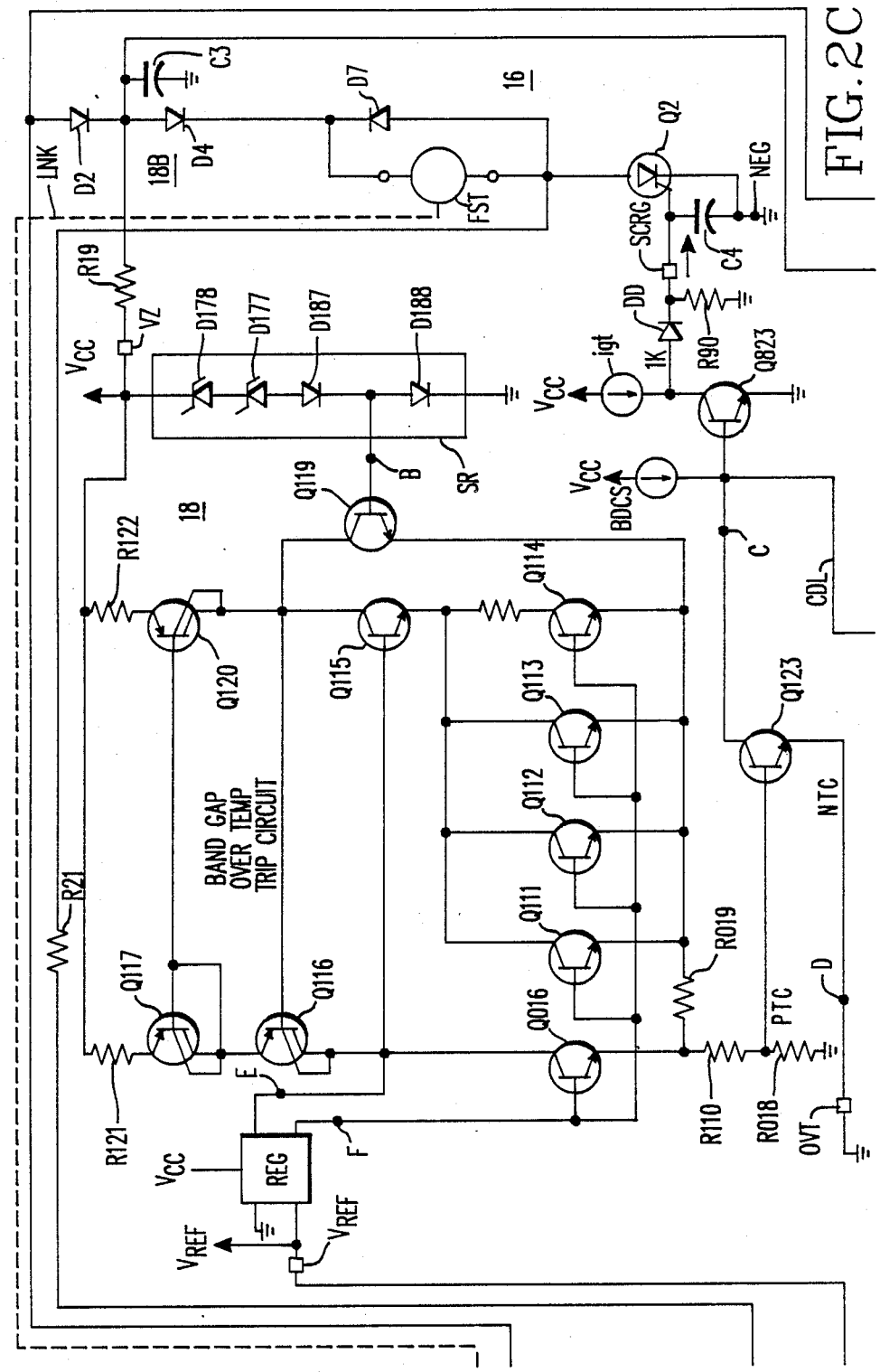

Referring now to FIGS. 2A-2C the interrelationship of the trip unit mechanism 16 and the solid state trip unit 18 with rating plug 20 is depicted. In particular, FIGS. 2A-2C depict an electrical and mechanical diagram partially in schematic form and partially in functional block diagram form of the electrical and electromechanical elements of the present invention and their structural and functional cooperation. To the upper left in FIG. 2A, the electromechanical representation of the circuit breaker contacts K1, K2 and K3 for a three-phase electrical system including line conductors L1, L2 and L3, respectively, as are most likely to be found in the frame 12 of FIG. 1 is depicted at 10A. Electromechanical frame portion 10A may also include three single phase rectifying bridges BR1, BR2 and BR3 interconnected at their respective inputs to current transformer arrangements RP, CP and LP, respectively and interconnected at their outputs in a well known diode bridge auctioneering arrangement. The three phase lines L1, L2 and L3 may be interconnected with an external electrical power SOURCE which supplies power to a LOAD through closed contacts K1, K2 and K3. The status of the contacts K1, K2 and K3 determines whether electrical power which is available at the SOURCE is supplied to the LOAD or not. Electrical current status in the lines L1, L2, L3 as monitored by the current transformers LP, CP and RP, respectively, may be determinative of whether the contacts K1, K2 and K3 are to be opened or not. Well known circuit breaker control relationships such as those which are associated with the $I^2t$ relationship and the instantaneous magnetic trip relationship may be utilized to determine the latter condition. Furthermore, the circuit breaker contacts K1, K2 and K3 may be opened or tripped manually without resort to determination of current conditions in the lines L1, L2 and L3. Although not described with respect to the particular embodiment of the invention shown in FIGS. 2A, 2B and 2C, other well known circuit breaker control relationship such as undervoltage, short circuit and the like may also be instrumental in causing circuit breaker contacts K1, K2 and K3 to open in a manner well known in the art.

The rating plug resistor 20 is shown schematically interconnected with the remainder of the solid state trip unit 18 so that the auctioneered output of the bridge arrangement BR1-BR2-BR3 may supply electrical current therethrough for determining trip conditions and trip current ranges. The output of current transformers RP, CP and LP respectively are auctioneered by diode bridges BR1-BR3 so that the current flowing through the rating plug resistor 20 is the largest of the three phase currents at any instant. Diodes D3 and D6, capacitors C1 and C11 and resistor R4 form a voltage peak detecting circuit the output of which is a voltage developed across parallel connected capacitors C1, C11 this voltage is proportional to the peak value of the current flowing through resistor R20. Resistor R4 bleeds charge from the combination of capacitors C1-C11 with a one second time constant in a "power-down" situation. The solid state trip unit 18 may comprise discrete circuit components or the like such as indicated at regions 18B and may comprise large scale integrated circuits (LSI) such as indicated at 18A. Neither the arrangement associated with discrete component region 18B nor the arrangement associated with the large scale integrated component region 18A is limiting. In a preferred embodiment of the invention, a chip or the like embodying the large scale integrated circuit depicted at 18A may be separately soldered or otherwise electrically and mechanically attached to a circuit board which forms a base for the solid state trip unit 18. Furthermore, the solid state trip unit 18 may interact electromechanically with a flux shunt trip unit FST shown to the right on FIG. 2C. The flux shunt trip unit FST may cooperate with a schematically represented and well known system of mechanical linkages indicated generally at LNK to cooperate with the previously-described contacts K1, K2 and K3. In a preferred embodiment of the invention, the flux shunt trip FST, its associated link arrangement LNK and the contacts K1, K2 and K3 may be considered as part of the trip unit mechanism 16 depicted in FIG. 1.

Construction Features of the Trip Unit Mechanism 16

With the exception of that part of FIGS. 2A-2C which is closely related to the electrical or electromechanical representation of the trip unit mechanism 16 at 18B and the portion 10A, that which is depicted therein may be best identified as a large scale integrated circuit (LSI) 18A for a solid state trip unit. With regard to trip unit mechanism 16 one terminal of the bridge BR3 is interconnected with one terminal of the rating plug 20, the other terminal of which is interconnected with the cathode of a diode DR, the anode of which is connected to system common or ground appropriately identified by the well known ground symbol and identified herein and hereinafter as NEG. Connected to the junction between the rating plug 20 and the bridge BR3 is the anode of a zener diode D8, the cathode of a diode D3 and one side of a resistive element R2. The regulating terminal of the zener diode D8 is connected to system common or ground, the anode of the diode D3 is connected to the cathode of a diode D6, the anode of which is connected to one side of the capacitive element C1, one side of the capacitive element C11, one side of the resistive element R4 and one side of a resistive element R3. The other side of the capacitive element C1, the other side of the capacitive element C11, and the other side of the resistive element R4 are connected to system ground. The other side of the resistive element R2 is connected to the SDIN terminal of the large scale integrated circuit or chip 18A. For purposes of simplicity of illustration, the large scale integrated circuit chip 18A will henceforth be designated "chip 18A". The other side of the resistive element R3 is connected to the LDIN terminal of the chip 18A. One terminal of the bridge BR1 is connected to the anode of a diode D1, the cathode of which is connected to one side of a resistive element R20, the anode of a diode D2 and the drain of a field effects transistor (FET) Q1. The cathode of the diode D2 is connected to the anode of a diode D4, one side of a resistive element R19, one side of a capacitive element C3 and one side of a resistive element R17. The other side of the resistive element R19 is connected to the VZ terminal of the chip 18A. The other side of the capacitive element C3 is connected to system ground. The cathode of the diode D4 is connected to one terminal of the flux shunt trip coil FST and to the cathode of a free-wheeling diode D7, the anode of which is connected to the other side of the flux shunt trip coil FST. The latter electrical point is also connected to the anode of a silicon controlled rectifier Q2 and to one side of a resistive element R21. The cathode of the silicon controlled rectifier Q2 is connected to system common or ground. The gate terminal of the silicon controlled rectifier Q2 is connected to the SCRG terminal of the chip 18A and to one side of a capacitive element C4, the other side of which is connected to system common or ground. The other side of resistive element R17 is connected to one side of a resistive element R16, one side of a resistive element R15 and to the VSEN terminal of the chip 18A. The other side of the resistive element R15 is connected to one side of a resistive element R14, one side of a resistive element R18 and the FETD terminal of the chip 18A. The other side of the resistive element R14 is connected to system common or ground. The other side of the resistive element R16 is connected to one side of the resistive element R12 and to the output terminal of an integrated circuit comparator IC2A. The other side of the resistive element R18 is connected to the gate terminal of transistor Q1. The Source terminal of the transistor Q1 is connected to one side of the resistive element R22 and the negative input terminal of a comparator IC2B. The positive input terminal of comparator IC2B is connected to one side of a resistive element R24 and one side of a resistive element R23. The other side of the resistive element R24 is connected to system common or ground. The other side of the resistive element R23 is connected to VREF comparator. The output of the comparator IC2B is connected to one side of a resistive element R25, the other side of which is connected to one side of a resistive element R7 and to the OVR terminal of the chip 18A. The other side of resistive element R21 is connected to the positive input terminal of the comparator IC2A. The anode of a diode D9 is connected to the positive input terminal of comparator IC2A and the cathode thereof is connected to the negative input terminal of comparator IC2A. Also connected to the negative input terminal of comparator IC2A is the terminal VREF of the chip 18A, the other side of the resistive element R7, one side of a resistive element R6, one side of a potentiometer element R5, one side of a resistive element R11 and one side of a capacitive element C7. The other side of the capacitive element C7 is connected to system common or ground. The other side of resistive element R6 and potentiometer element R5 are connected together and to the SDPU terminal of chip 18A. The other side of the resistive element R11 is connected to the LDPU terminal of chip 18A. The negative input terminal of the comparator IC2A is also connected to the INST terminal of the chip 18A by way of a programming resistor RP. One side of a capacitive element C2 is connected to the LDT terminal of the chip 18A. The other side of the capacitive element C2 is connected to system common or ground. A test point TP1 is connected to the LDTP terminal of the chip 18A. One side of a capacitive element SDTC is connected to the SDT terminal of the chip 18A. The other side of the capacitive element SDTC is connected to system common or ground. Terminal SDCV of chip 18A may be connected to system common or ground. One side of a resistive element R9 is connected to the TADJ terminal of chip 18A. The other side of resistive element R9 is connected to one side of resistive element R20 and to one side of a potentiometer element R26. The other side of the potentiometer element R26 and the other side of the resistive element R20 are connected to system common or ground. One side of a resistive element R13 and one side of a capacitive element C5 as well as test point TP2 are connected to the SDPH terminal of chip 18A. The other side of capacitive element C5 and the other side of resistive element R13 are connected to system common or ground. One side of resistive elements R8, R27 and R28 are connected together and to terminal MREF of chip 18A. The other side of resistive element R8, resistive element R27 and resistive element R28 are connected to system common or ground.

Construction Features of Chip 18A

Referring specifically to FIGS. 2B and 2C, construction features associated with the chip 18A are described. In particular, interconnected internally with the VREF terminal of the chip 18A, is the output of a voltage regulator REG at which the power supply voltage (designated VREF for simplicity) is present. One terminal of regulator REG is grounded to system common. Interconnected with the input of the regulator REG are two terminals designated E and F. Terminal F is connected to the bases of transistors Q016, Q111, Q112, Q113, and Q114, the emitters of transistors Q111, Q112, Q113 and Q114 are connected to one side of a resistive element R019, the other side of which is connected to the emitter of transistor Q016 and to one side of a resistive element R110. The other side of resistive element R110 is connected to one side of a resistive element R018 and to the base of a transistor Q123. The other side of resistive element R018 is connected to system common. The emitter of transistor Q123 may be externally connected to system common or ground through the OVT terminal of the chip 18A. This latter point is also designated as node D. The collector of transistor Q123 is connected through Node C to the base of a transistor Q823, one side of a base drive current source BDCS and to a common drive line CDL. The other side of the base drive current source BDCS is connected to a voltage source VCC. The emitter of transistor Q823 is connected to system common or ground and the collector thereof is connected to one side of a current source designated $I_gt$ and to the anode of a diode DD. The other side of the current source $I_gt$ is connected to the VCC voltage source. The cathode of the diode DD is connected to one side of a resistive element R90 and to the SCRG terminal of the chip 18A. The other side of the resistive element R90 is connected to system common. Also connected to the emitters of transistors Q111, Q112, Q113, and Q114 is the emitter of a transistor Q119, the base of which is designated as node B. The collector of transistor Q119 is connected to the collector of transistor Q115, the base of a transistor Q116. The base of tee transistor Q115 is connected to the collector of transistor Q016, the dual collectors of transistors Q116 and the node E of the regulator REG. The emitter of transistor Q116 is connected to the dual collectors of a transistor Q117 and the base of transistor Q117. The base of transistor Q117 is also connected to the base of transistor Q120. The emitter of transistor Q120 is connected to one side of resistive element R122, the other side of which is connected to voltage source VCC. The emitter of transistor Q117 is connected to one side of resistive element R121, the other side of which is also connected to voltage source VCC. The circuit internal to the nodes B-C-D-E-F is identified as a "Band Gap Over Temperature Circuit".

Connected to the base of transistor Q119 is the junction between the anode of a diode D188 and the cathode of a series connected diode D187. The cathode of the diode D188 is connected to system common or ground. The anode of diode D187 is connected to the anode of a zener diode D177, the regulating terminal of which is connected to the anode of a second zener diode D178. The regulating terminal of the second zener diode D178 is connected to the VZ terminal of the chip 18A. This latter arrangement is designated SR.

The MREF terminal of chip 18A is connected to the negative input terminal of an operational amplifier comparator OA1. A voltage equal to one half VREF is disposed on the positive input terminal of the operational amplifier comparator OA1. The operational amplifier comparator OA1 drives a current source iREF which is interconnected to one terminal of a squaring-/dividing circuit SD. The LDIN terminal of chip 18A is connected to the negative input terminal of an operational amplifier OA2 which drives two current mirror-type current sources ⅔ iLD and ⅓ iLD. The ⅓ iLD current source is interconnected with another terminal of the squaring/dividing circuit SD and is fed back to the negative input terminal of the operational amplifier OA2. In a like manner, the current source ⅔ iLD is connected to the LDPU terminal of the chip 18A. The other terminal of the current source ⅔ iLD is also fed back to the negative input terminal of the operational amplifier OA2. The configuration of operational amplifier OA2 holds terminal LDIN at virtual ground potential. The positive input terminal of the operational amplifier OA2 is grounded. The LDPU terminal of the chip 18A is connected to the positive input terminal of a comparator COM1, the negative input terminal of which has the voltage $\frac{2}{3}$ VREF disposed thereupon. Comparator COM1 provides dual parallel outputs one of which is connected to one side of a resistive element R490. This latter output is designated C'. The other output of the comparator COM1 is designated A' and is connected to one side of a resistive element R763, to the base of a transistor Q764 and to the collector and base of a transistor Q787. The other side of the resistive element R763 is connected to the collector of the transistor Q764 and one side of a resistive element R4104. The emitter of the transistor Q764 is connected to one side of a resistive element R762, the other side of which is connected to the emitter of transistor Q787 and to circuit ground or common. The other side of the resistive element R4104 is connected to the base of a transistor Q766 the emitter of which is connected to system common. The collector of a transistor Q766 is designated as node or terminal E' and is connected to the LDT terminal of the chip 18A, to the anode of a diode D722 and to the cathode of a diode D768. The cathode of a diode D722 is designated as node or terminal B' and is connected to the VREF power supply voltage. The anode of the diode D768 is designated as terminal or node F' and is connected to the LDTP terminal of the chip 18A. It is also connected to the collector of a transistor Q769 and to one of the dual outputs of the squaring dividing circuit SD. This latter point is designated D'. The base of the transistor Q769 is connected to the other side of the resistor R490 to one side of a resistive element R770. The other side of resistive element R770 is connected to the emitter of transistor Q769 and to system common or ground. The circuit internal to the elements A'-B'-C'-D'-E'-F' is the "Long Time Delay Memory Circuit".

Another output terminal of the squaring dividing circuit SD is connected to the emitter of a switching transistor QA10. The terminal SDPH of the chip 18A is connected to the negative input terminal of a comparator COM2, the positive input terminal of which has the voltage VREF impressed thereupon. The negative input terminal of the comparator COM2 is also connected to one terminal of a current source iCH, the other terminal of which is connected to the VCC power supply terminal. The output of the comparator COM2 is connected to the base of a transistor QA4 and the base of a transistor QA5, the emitters of which are both grounded. The collector of transistor QA4 is connected to the base of a transistor QA2, to the collector of a transistor QA3 and to one side of a resistive element R111. The other side of the resistive element R111 is connected to the VCC voltage. The emitter of the transistor QA2 and the emitter of the transistor QA3 are both grounded. The collector of transistor QA2 is connected to the base of the previously-described transistor Q823 through common drive line CDL. The SDIN terminal of the chip 18A is connected to the negative input terminal of an operational amplifier OA3, the positive input of which is grounded. The output terminal of the operational amplifier OA3 is connected to control current mirror type current sources $\frac{1}{3}$ iSD and $\frac{2}{3}$ iSD. One main terminal of each of the current sources $\frac{1}{3}$ iSD and $\frac{2}{3}$ iSD is fed back to the negative input terminal of the operational amplifier OA3. The configuration of operational amplifier OA3 holds terminal SDIN at virtual ground potential. The other main terminal of the current source $\frac{1}{3}$ iSD is connected to the OVR input pin and the positive terminal of COM3. The other o main terminal of the current source $\frac{2}{3}$ iSD is connected to the positive input terminal of a comparator COM7 and to the SDPU terminal of the chip 18A. The negative input terminal of the comparator COM7 is connected to two-thirds of the voltage source VREF. The collector of transistor QA1 is connected to the base of transistor Q823 through common drive line CDL. The positive input terminal of the comparator COM3 is connected to the OVR terminal of the chip 18A. The negative input terminal of comparator COM3 is connected to receive two-thirds of the power supply voltage VREF. The LDT terminal of the chip 18A is connected to one of two positive input terminals of OR comparator OC1. The only negative input terminal of the OR comparator OC1 is connected to receive the VREF power supply voltage. The other positive input terminal of the OR comparator OC1 is connected to the SDT terminal of the chip 18A, to the collector of switching transistor QA10, to the collector of transistor QA5 and to the emitter of switching transistor QA9. The base of switching transistor QA9 and the base of switching transistor QA10 are both connected to the SDCV terminal of the chip 18A. The output of the OR comparator OC1 is connected to the base of transistor QA8 the emitter of which is grounded. The collector of transistor QA8 is also connected to the base of transistor Q823 through the common drive line CDL. The TADJ terminal of chip 18A is connected to the negative input terminal of operational amplifier OA4, the positive input terminal of which is connected to a voltage representing one-fourth of the VREF power supply voltage. The output of OA4 is connected to current mirror current sources iTADA and two-thirds iTAD. One main terminal of current source one third iTADA is connected to a main terminal of a current source one third iTADB. One main terminal of the current source one-third iTADC is connected to the collector of transistor QA9. The other main terminal of current source one-third iTADC is connected to the VCC power supply. One main terminal of the current source two-thirds iTAD and one-third iTADA is connected to the negative input terminal of the operational amplifier OA4. The other main terminal of the current source two-thirds iTAD is connected to the INST terminal of the chip 18A and to the negative input terminal of comparator COM5, the positive input terminal of which is interconnected to have disposed thereupon two-thirds of the VREF power supply voltage. The output terminal of the comparator COM5 is connected to the base of the transistor QA3, the emitter of which is grounded. The VSEN terminal of the chip 18A is connected to the positive input terminal of a comparator COM6 and to the regulating terminal of a ezener diode ZZ, the anode which is connected to system common or ground. The negative input terminal of the comparator COM6 is connected to receive the power supply voltage VREF. Comparator COM6 has dual complementary outputs one of which is connected to the base of a transistor QA6 and the other of which is connected to the base of a transistor QA7. The collector of transistor QA7 is connected to the VCC power supply voltage. The emitter of transistor QA7 is connected to the FETD terminal of the chip 18A and to the collector of transistor QA6. The emitter of transistor QA6 is grounded.

Operating Characteristics of Chip 18A

Current ⅓ iSD flows through program resistor R7 into terminal OVR. If the voltage at OVR drops below 3.33 VREF, then gate current flows out of the SCRG terminal. A current equal to two-thirds of iSD flows through the programming resistors R6 and R5 and into the SDPU terminal, a short delay pick up operation occurs when the voltage at this pin drops below 3.33 VREF. As was mentioned previously, the voltage at pin SDIN is maintained at virtual ground potential. Current iSD flows out of this pin and into resistor R2, this latter current is used in a short delay instantaneous pickup circuit and in an override circuit. A current which is equal to two-thirds of the current iLD flows through resistor R11 and into pin LDPU. This current is used by the long delay pickup and the long delay squaring circuit SD. Pin MREF is maintained at 2.5 VREF. Current flows out of this pin and into the combination of resistive elements R8, R27 and R28. The voltage at terminal LDTP is at zero before pickup and greater than a transistor base-to-emitter voltage drop after a long delay pickup occurs. When a long delay pick up occurs, a current proportional to iLD² flows out of this pin and into the long delay timing capacitor C2. If the voltage across that capacitor C2 exceeds VREF, then gate current flows out of the SCRG pin. If the voltage across the capacitor C2 is greater than zero, and there is no long delay pickup, then a current of approximately 1 microamp flows into this terminal from capacitor C2 until it is discharged. Pin VZ is connected to the cathode or regulating terminal of the zener shunt regulator SR. Pin SCRG provides gate current for the silicon controlled rectifier Q2. The pin or terminal FETD is the gate drive pin for the field effects transistor Q1. Pin VSEN is the sense input for the power supply control circuit. If the voltage on this pin is between certain predetermined levels, the field effect transistor Q1 is turned on by the voltage at terminal FETD. Pin OVT when connected to ground enables the Over Temperature Band Gap Trip Circuit. A current which equals two-thirds of ITAD flows through the instantaneous program resistor and into pin INST. If the voltage at this pin is less than ⅔ VREF and the voltage at pin SDPU is less than ⅔ VREF, then a gate current flows out of the SCRG pin. The voltage at pin TADJ is maintained at a predetermined voltage which in a preferred embodiment of the invention may be 1.25 volts. Current iTAD flows out of this pin and into the short delay/instantaneous programming resistors R20 and R26. This latter current is used by the short delay circuit and the instantaneous circuits. If the pin SDCV is connected to ground, then a programmable constant current which is one-third of iTAD charges the short delay timing capacitor STDC when a short delay pickup occurs. However, if the pin SDCV is left disconnected, then a current proportional to ILD² charges the short delay timing capacitor SDTC. A current determined by terminal SDCV flows out of pin or terminal SDT into the short delay timing capacitor SDTC. If the voltage across the timing capacitor SDTC exceeds VREF, then a gate current flows out of the SCRG pin. When a short delay pickup occurs, a charging current flows out of pin or terminal SDPH.

The Theory of Operation

Resistive element R19, zener diodes D177 and D178 and diodes D187 and D188 form the temperature compensated zener shunt regulator SR. In a preferred embodiment of the invention, when the power supply is in regulation, the voltage at pin VZ which is also equal to voltage VCC is 14.2 volts±10%.

In the preferred embodiment of the invention, when the VCC is present, transistor Q119 provides a base current for a Wilson current mirror formed by transistors Q116, Q117 and Q120. Transistor Q116 turns on REG the output of which is REF. The voltage at the base of Q016 increases, turning on the band gap reference represented by transistors Q016, Q111 through Q114, resistors R018, R019 and R110. The voltage across resistors R018, R019 and R110 increases and turns off the start up transistor Q119. The Wilson current mirror sets equal currents in the collectors of transistor Q116 and the combination of transistors Q111 through Q114 resulting in a current density in transistor Q016 that is four times the current density in each transistor Q111 through Q114. Since the transistor characteristics of a monochip are closely matched, the difference in currents will result in a base-to-emitter voltage which is set forth in Equation (1):

$$\delta VBE = \frac{kT}{q} \times \ln(iQ016/iQ111) \quad (1)$$

where k is Boltzmann's constant, T is absolute temperature, and q is the charge of an electron. With a current ratio of 4:1, δVBE will be 36 millivolts at 25° C. This voltage difference appears across resistive element R019. The voltage across series connected resistors R018 and R110 will be two times ((R018+R110)/R019) times the voltage drop across resistive element R019. Therefore, the voltage drop across resistive elements R019 and R110 is 576 millivolts at 25° C. The positive temperature coefficient of the voltage across resistive element R018 and R110 is approximately equal to the magnitude of the negative temperature coefficient of transistor's Q016 base-to-emitter voltage. The voltage across resistive element R018 and R110 is summed through the base to emitter voltage of transistor Q016 resulting in a virtual zero temperature coefficient reference voltage of 1.25 volts at terminal F. This latter voltage output is supplied to the regulator REG causing the voltage reference output VREF to be +5 volts, ±5%.

The overtemperature circuit formed by R018 and Q123 is part of the band-gap regulator circuit. This circuit is enabled when pin OVT is connected to system common or ground. In this circuit the voltage drop across resistor R018 is 432 mV at 25° C. and has a positive temperature coefficient $T_c(R018)$ of 1.9 mV/°C. The base-emitter voltage of transistor Q123, at a collector current of 100 μA, is 675 mV at 25° C. and has a negative temperature coefficient $T_c(Q123)$ of −1.9 mV/°C. Since the voltage across the base of transistor Q123 is lower than 675 mV at 25° C., transistor Q123 is "off". Transistor Q123 will turn on when the base-emitter voltage of transistor Q123 is equal to the voltage across resistor R18. This occurs at a temperature of approximately 90° C. as shown in Equation (2).

$$\text{Temp} = \frac{VBE(Q123) - VR018}{T_c(R018) - T_c(Q123)} + 25° \text{ C.} \quad (2)$$

At a temperature of approximately 90° C. the base-emitter of transistor Q123 is forward biased, causing it to turn on. This removes the base drive from transistor Q123, allowing gate current to flow out of the SCRG pin or terminal.

It can be seen, therefore, as the temperature of the environment in which transistor Q123 and resistor R018 reside increases, the voltage from the base-to-emitter of transistor Q123 decreases and the voltage across resistor R018 increases, eventually a point is reached where the transistor Q123 is turned on thus causing the silicon-controlled rectifier Q2 to conduct. In one embodiment of the invention, a resistor may be connected between terminal OVT and ground. The resistor may be chosen such that the circuit characteristics of 20 ohms per °C. is utilized to increase the temperature at which tripping occurs. In another embodiment of the invention, the pin or terminal OVT may be left dangling or unconnected to ground in which case, the temperature detection and protection circuit is disabled, thus essentially providing no internal temperature protection for the circuit breaker.

The circuit formed by transistors Q787, Q764, Q766 and resistors R762 and R763 is a current mirror which is designed to provide a long delay memory function. If the voltage across the long delay capacitor C2 is greater than zero, and the long delay input LDT drops below pickup, then the collector of transistor Q766 sinks approximately 1 μA of current until the capacitor C2 is discharged to zero.

The trip unit utilizing the custom LSI circuit 18A has the following functions:

Long delay—The long delay function has an $I^2t$ inverse time characteristic which provides system protection under overload conditions. The current being pulled out of the terminal LDIN which is a function of the peak value of the voltage on the capacitors C1–C11 is designated NiLD. Two-thirds of that current is pulled from the VREF power supply through resistor R11 into the LDPU input terminal. Resistor R11 is the long delay pick up resistor and it determines the threshold value for which the breaker will begin doing its protection function. This means that there are currents flowing in the main lines, L1, L2 and L3 below which the trip unit 18 will provide no action. That value is determined by the long delay pickup resistor R11, it's called the threshold value of current. Typically, that value is greater than 1 per unit of rated current and less than 1.25 per unit of rated current. The actual current rating value of the breaker is determined by the removable rating plug or resistor 20 in this case. It will be remembered that terminal LDPU which is the long delay terminal is interconnected to the positive input terminal of comparator COM1 which has two outputs. The output at node A' is an output to the long delay time memory circuit which is the subject of the present invention. Resistive element R763 and resistive element RA1O4 cooperating with resistive element R762 and transistors Q764 and Q787 cause the current which flows from the node A' of comparator COM1 to be reflected into a proportional collector current in the transistor Q766. If the condition of the current in the main lines L1, L2 or L3 is such that there is no requirement for a long delay pickup, i.e. the voltage at pin LDPU is greater than $\frac{2}{3}$ VREF, comparator COM1 will provide output current to node A' which in turn will cause collector current to flow in the transistor Q766 which will continuously discharge capacitive element C2 through terminal LDT. However, if the current in the lines L1, L2 and L3 increases to such a level that the current iLD flowing out of the terminal LDIN causes the comparator COM1 to shut off so that no current is flowing into node A', the collector current in the transistor Q766 will cease to flow causing a condition at the node E' which will allow the capacitive element C2 to be charged by current io. Note that the comparator COM1 is turned on and off because the pin LDPU which is interconnected with the current source $\frac{2}{3}$ iLD will change to any voltage which will cause the current $\frac{2}{3}$ iLD to continue to flow. This means that eventually a point is reached in which the voltage on the positive input terminal of the comparator COM1 is less than two-thirds VREF in which case the current at node A' will cease to flow. Therefore, as long as the current in the main lines L1, L2 or L3 is below the pickup level, the state of the comparator COM1 will be such that the current will flow into nodes A' and C'. The current which flows into node A' causes a proportional current to flow out of C2 and into the collector of Q766 which eventually discharges capacitor (2 to zero volts). Furthermore, the current that flows into the node C' causes the transistor Q769 to conduct, thus providing a current sink for any current which is flowing from the node D' into the node F'. This current always flows because it represents the output of the squaring dividing circuit SD. The output of the squaring dividing circuit is a current io, which is proportional to the square of the current iLD. Current iLD is proportional to the peak detected voltage on the capacitor C1–C11 which in turn is proportional to the amount of current flowing in the lines L1, L2 and L3. The square of this current times time provides the well known $I^2t$ curve which is utilized by circuit breaker control apparatus to cause circuit breaker contacts to open as a function thereof. In the prior art, the circuit represented by elements Q762, Q764, Q766 and Q767 and resistors R762 and R763 represented a passive memory resistive element which was utilized to slowly discharge the capacitive element C2 in the event that the current in the main lines dropped below the long delay pick-up level. However, because it is a passive element, it is also utilized to sink a portion of the charging current from the node D' which would otherwise go to exclusively charge the capacitive elements C2. Because of this an error is introduced into the $I^2t$ relationship. In the present invention, this error is eliminated by replacing the memory resistor by the active elements associated with the transistor Q766. Transistor Q769 is only utilized below the pickup level because of it interconnection by way of resistive R490 and R770 to one of the dual outputs of the comparator COM1. Another effect of the interconnection is to allow the capacitive element C2 to be charged after pickup with the transistor element Q769 turned off. However, when the capacitive element begins to discharge through Q766, the transistor element Q769 is turned on.

Short delay—The short delay function can be programmed for a fixed short delay time characteristic, or an $I^2t$ inverse short time characteristic which provides system protection under short circuit conditions.

Instantaneous—The instantaneous function, which trips the breaker without any intentional delay, provides system protection under short circuit conditions.

Override—The override function provides high fault protection for the system when the trip unit has a short delay function. With this feature, if a fault occurs that is below the override pickup setting, then the short delay function provides short circuit protection for the system. Faults above the override setting will trip the breaker without any intentional delay.

Overtemperature—The overtemperature function senses the ambient temperature outside the chip, and causes the breaker to trip if the temperature exceeds a predetermined level.

The collectors of output transistors for the long delay, short delay, instantaneous, override and overtemperature circuits are connected to the base of transistor Q823 through the common drive line CDL. A bias current of 120 µA is supplied to the base of transistor Q823, keeping it turned on. When any of the above-mentioned circuits are turned on, and resistor Q823 is turned off, allowing the output current igt to flow through diode DD and out of pin SCRG. Pin SCRG is connected to the gate of thyristor Q2 which is then turned on by current igt.

If the voltage at the VSEN input is greater than 11.7 V, then the output voltage at pin FETD increases to 12.4 V, turning on field effects transistor FET Q1 which diverts charging current away from capacitor C3. Resistor R15 provides approximately 6 V of hysteresis for the circuit. When the last mentioned power supply is in regulation the voltage at the cathode of diode D2 is approximately 40 V. Resistor R19 and chip 18A form a temperature compensated, Zener shunt regulator. When the supply is in regulation the voltage from pin VZ to NEG is +14.2 V±10%. Pin VREF is the output of the bandgap regulator circuit which has an output of 5 V±5%.

The long delay input at pin LDIN is maintained at virtual ground. The one per unit voltage across the peak detecting capacitors C1–C11 is 2.12 V, resulting in a long delay input current iLD equal to 22.25 µA per unit. The long delay input current can be calculated using:

$$iLD = \frac{V_{(C1-C11)}}{R3} \quad (3)$$

A current equal to two-thirds of the long delay input current ⅔ iLD flows through the long delay pickup resistor R11. A long delay pickup occurs when the voltage at pin LDPU decreases below two-thirds of VREF. The per unit long delay pickup can be determined using:

$$LD\ PICKUP = \frac{1.124 \times 10^5}{R11} \quad (4)$$

The long delay timing capacitor C2 is connected to pin LDT. If a long delay pickup occurs, then charging current iLDT which is proportional to i²LD squared flows into C2. A long delay trip occurs when the voltage across C2 exceeds VREF. The long delay trip time can be calculated using:

$$t_{LONG\ DELAY} = \frac{56.3 \times C4}{R16 \times i^2LD} \quad (5)$$

The overtemperature trip circuit is enabled by connecting pin OVT to pin NEG. If the case temperature of the integrated circuit exceeds 90° C. ±20%, an overtemperature trip occurs.

If a trip occurs, an 800 µA gate firing current flows out of pin SCRG and into the gate of SCR Q2, turning it on. When SCR Q2 is triggered on, the FTD trips the mechanism and the breaker 10 opens.

The present invention as thus disclosed and described teaches a circuit breaker 10 with separable main contacts K1, K2 and K3 connected in circuit relationship with conductors such as L1, L2 and L3 which are to be protected by the circuit breaker 10. Opening apparatus such as shown at LNK and FST cooperates with the main contacts K1 through K3 as a function of voltage. A capacitor C2 is provided which interconnects with the opening means FST and LNK through the remainder of the circuit indicated at 18, for example. Charging current iLDT generated at squaring-dividing circuit SD charges the capacitor C2 through terminal LDT and produces a voltage across capacitor C2 which is proportional to the square of the highest current flowing in any of the conductors L1, L2 or L3. Switchable memory means which may include transistor Q766 and other circuit elements as described previously is interconnected with the capacitor C2 for discharging the capacitor C2 with a predetermined time constant for reducing the voltage across capacitor C2. The predetermined time constant is related to the rate of heat dissipation in the monitored conductor L1, L2 or L3 as the case may be. The control device which includes resistive element R763, resistive element R4104, resistive element R762, and transistors Q764 and Q787 is provided for deactivating switchable memory device Q766 when the current in the monitored line L1, L2 or L3 is above a predetermined value which may be but is not limited to 125% of load current. When this happens, substantially none of the charging current iLDT flows through the transistor element Q766.

The invention also includes a current source such as may be found in the band gap regulator which utilized the transistors Q016, Q111, Q112, Q113 and Q114. This current source provides a relatively fixed current over a predetermined range of temperature for the resistors R110 and R018. The current flowing through these resistors develops a voltage across these resistors. The resistance of these resistors changes with a positive temperature coefficient as the ambient temperature around the resistive elements increases. A transistor Q123 is provided which is interconnected at the base-to-emitter circuit thereof with resistors R110 and R018 in a voltage dividing relationship. The collector-to-emitter circuit of the transistor Q123 is connected with the current opening device which includes the transistor Q823, the silicon controlled rectifier Q2 and the flux shunt trip device FST for causing the circuit breaker contacts to open when the base-to-emitter switching voltage of the transistor Q123 is less than the voltage across the resistor R018. The base-to-emitter circuit of the transistor Q123 has a negative temperature coefficient so that the base-to-emitter voltage decreases as the ambient temperature increases. It is to be noted that the resistive devices R110 and R018 is originally part of the temperature compensating circuit for the band gap regulator. In a preferred embodiment of the invention, the transistor Q123 has the emitter thereof grounded at the OVT terminal.

What I claim as my invention is:
1. A circuit breaker, comprising:
   separable main contacts connected in circuit relationship with a conductor to be protected;
   opening means cooperable with said separable main contacts for opening said separable main contacts as a function of voltage;

capacitor means interconnected with said opening means;

analog charging current generating means interconnected with said conductor and said capacitor means for producing a charging current for said capacitor means in proportion to the square of the current flowing in said conductor for producing said voltage across said capacitor means, said voltage across said capacitor means being related to said square of said current flowing in said conductor;

switchable memory means interconnected with said capacitor means for discharging said capacitor means with a predetermined time constant when actuated for reducing said voltage, said predetermined time constant being related to the rate of heat dissipation in said conductor when the current in said conductor falls below a predetermined value; and control means for actuating said switchable memory means when said conductor current is below said predetermined value and for deactivating said switchable memory means when said current is above said predetermined value so that substantially, non of said charging current flows therethrough.

2. The circuit breaker claimed in claim 1 wherein said switchable memory means comprises a resistive element.

3. The circuit breaker claimed in claim 1 wherein said switchable memory means comprises a transistor element.

* * * * *